United States Patent [19]
Hills et al.

[11] 3,910,552
[45] Oct. 7, 1975

[54] ADJUSTABLE WAFER BUTTERFLY VALVE

[75] Inventors: James B. Hills, Holden; Robert H. Osthues, West Boylston, both of Mass.

[73] Assignee: Worcester Controls Corporation, West Boylston, Mass.

[22] Filed: Nov. 18, 1974

[21] Appl. No.: 524,856

[52] U.S. Cl. ................. 251/148; 251/170; 251/307
[51] Int. Cl.² ..................... F16K 1/22; F16K 1/226
[58] Field of Search ........... 251/148, 150, 151, 152, 251/170, 173, 306, 307

[56] References Cited
UNITED STATES PATENTS

| | | | |
|---|---|---|---|
| 3,069,128 | 12/1962 | Grove | 251/173 |
| 3,100,500 | 8/1963 | Stillwagon | 251/306 X |
| 3,376,014 | 4/1968 | Buckley et al. | 137/375 |
| 3,447,780 | 6/1969 | Hobson, Jr. | 251/306 |
| 3,737,144 | 6/1973 | Duncan | 251/307 |
| 3,782,684 | 1/1974 | Stephens et al. | 251/306 |

*Primary Examiner*—William R. Cline
*Attorney, Agent, or Firm*—Elliott I. Pollock

[57] ABSTRACT

A wafer-type butterfly valve unit for insertion between a pair of spaced pipe flanges in a pipeline comprises a pair of flat-sided metallic body halves of substantially semi-circular interior cross section positioned in spaced, opposed relation to one another to define a substantially circular region therebetween. A flat-sided comparatively massive annular seat ring of resilient material is located within said region, and a valve disc is mounted for pivotal movement within the seat ring. A pair of flat-sided annular end rings are positioned in axially spaced relation to one another on opposite sides of the body halves in metal-to-metal contact with the adjacent flat surfaces of the body halves and in sealing engagement with the end surfaces of the seat ring, and each end ring includes an outwardly projecting lip which engages a limited marginal portion of the inner circular periphery of the seat ring to center the end ring relative to the opposed body halves and to inhibit wash-out of the seat ring. Bolts extend between the body halves for varying the radial spacing between the body halves to vary the sealing forces between the valve disc and seat ring, and further bolts extend in an axial direction between the pipe flanges to apply the axial forces imposed between the pipe flanges, end rings, body halves, and seat ring.

13 Claims, 6 Drawing Figures

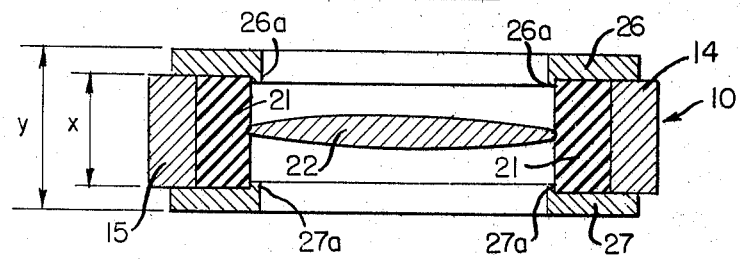
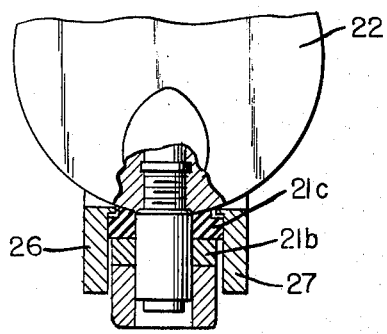
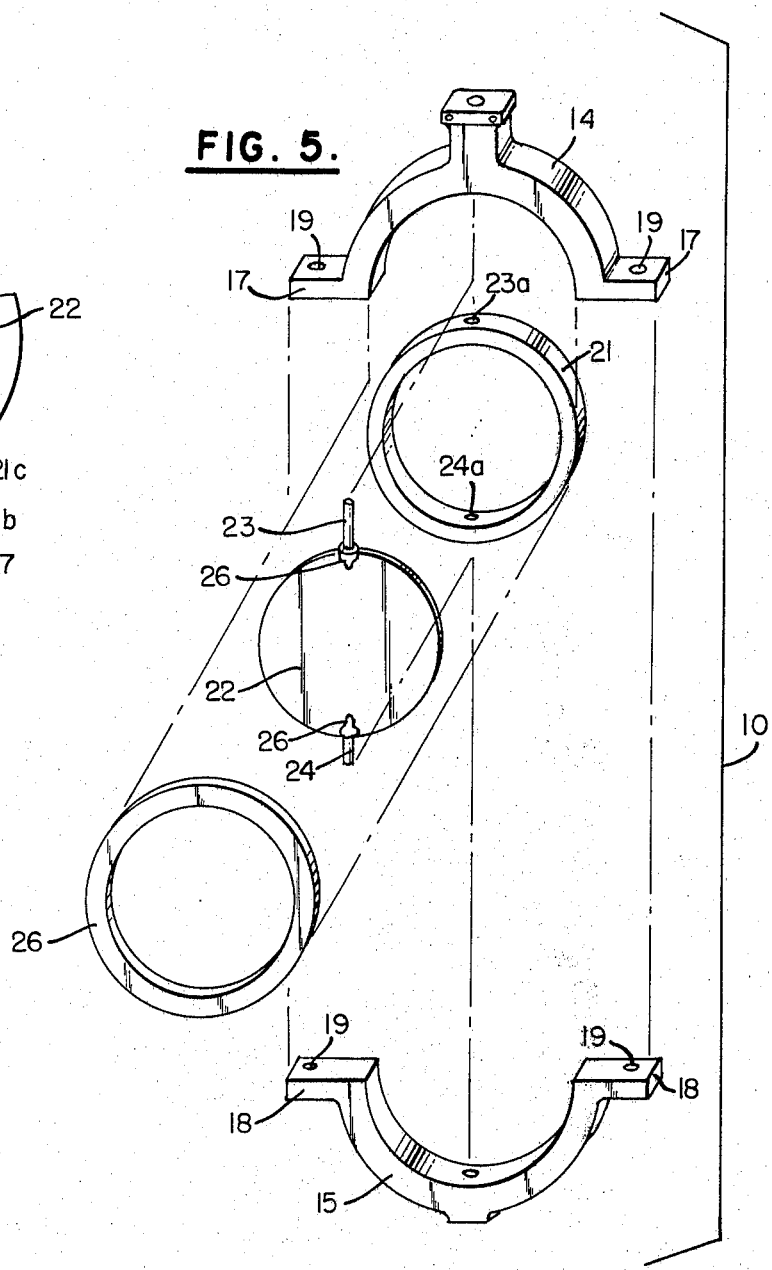

ADJUSTABLE WAFER BUTTERFLY VALVE

BACKGROUND OF THE INVENTION

Wafer-type butterfly valves are, in themselves, well known. They normally comprise a valve unit consisting of a comparatively thin body having a pivotally mounted valve disc associated with a sealing structure, with the entire unit being dimensioned to exhibit a thickness corresponding to the spacing (or "laying length") between a pair of pipe flanges in a pipeline. The unit is slipped into place between the pipe flanges and retained in position by bolts extending between the pipe flanges, thereby to provide a valving function in the pipeline. Valves of this general type are depicted, for example, in Grove U.S. Pat. No. 3,069,128 and in Buckley et al. U.S. Pat. No. 3,376,014.

In general, wafer-type butterfly valves are considered to be fairly inexpensive valves which are used in non-critical service applications. Historically, they have the reputation of being "leakers" both in an axial direction through the valve when the valve is supposedly in its closed condition, and in a radial direction externally of the valve and piping system particularly in the region of the valve disc shaft seals. These undesirable characteristics have resulted from the fact that prior art wafer-type valves have employed seats and seals of the O-ring type which, after a period of use, tend to wear and leak, and the valve constructions have been such that, once such leaking commences, there is no way to correct the situation other than by removing the valve unit and replacing it with a new valve unit. The present invention obviates this major problem in prior art wafer-type valves by providing an improved valve unit which employs a far more massive seat arrangement than has been common in such valves heretofore, in conjunction with an adjustment arrangement operative to vary the pressure imposed on the seat by the adjacent body and valve disc structures, to re-establish a proper seal between the valve disc, its shaft, and the valve seat if any leakage sould occur.

Prior art wafer type valve installations have been subject to the further disadvantage that different laying lenghs (or distances between the pipe flanges) may be present from one installation to another. Since it has been customary to dimension a given wafer-type valve unit to exhibit a predetermined axial dimension corresponding to a specific laying length, it has been necessary to provide valve units of different laying lengths for use in various different installations or at various different locations in a given installation. The present invention obviates this further disadvantage of the prior art by providing a wafer-type valve unit of modular type comprising a main valve unit having an axial dimension less than the spacing between the pipe flanges, in conjunction with a pair of metallic end rings which have an axial dimension sufficient, when used in conjunction with the main unit, to provide a composite axial dimension corresponding to the laying length in any particular installation. The same main unit can be used in a variety of different installations simply by associating that main unit with end rings of appropriate thickness.

SUMMARY OF THE INVENTION

In accordance with the present invention, a wafer-type butterfly valve unit adapted for insertion between a pair of spaced pipe flanges in a pipeline, wherein said flanges have a plurality of bolts extending therebetween in an axial direction transverse to said flanges for exerting axially directed forces upon said unit to retain said unit between said pipe flanges, comprises a pair of separate, metallic body halves of like, substantially semicircular cross-sectional shape positioned in spaced, opposed relation to one another to define a substantially circular region therebetween. Each of the body halves is flat-sided, and exhibits a pair of spaced parallel planar end faces which are positioned in alignment with the spaced planar end faces of the other body half, each of said end faces being adapted to be positioned in spaced, substantially parallel relation to the pipe flanges. The face-to-face dimension between the spaced end faces of each body half is less than the spacing between the pipe flanges.

A comparatively massive, resilient seat ring of unitary, annular configuration is positioned in the substantially circular region between the body halves, and a valve disc is mounted for pivotal movement within said seat ring through the agency of shaft sections which extend from diametrically opposed portions of the valve disc through apertures in the seat ring and into the opposed body halves. The outer periphery of the valve disc is in engagement with the inner diameter of the seat ring, and the outer diameter of the seat ring is in engagement with the spaced, substantially semicircular inner surfaces of the opposed body halves.

Adjustable fastening means, e.g., bolts, extend between the body halves for exerting radially directed forces between the body halves to selectively vary the radial spacing between the body halves. Adjustment of the fastening means is accordingly operative to vary the compressive forces exerted by the body halves on the annular seat ring thereby to vary the sealing forces between the seat ring and the valve disc both in the region of the periphery of the valve disc and in the regions of its shaft.

Two separate, metallic spacer rings or end rings of flat, annular configuration, not necessarily identical to one another, are disposed in spaced relation to one another in engagement with the aligned end faces of the opposed body halves respectively to fill the spaces betweten said end faces of the opposed body halves and the pipe flanges. The outer diameter of each spacer ring is sufficiently large to maintain the spacer ring in metal-to-metal surface engagement with the adjacent aligned end faces of the body halves, and in radially slidable engagement with said adjacent aligned end faces, when the radial spacing between the body halves is varied by adjustment of the fastening means. The inner diameter of each of said flat spacer rings is less than the maximum adjusted diameter of the substantially circular region between the opposed body halves whereby the spacer rings or end rings define flat surface portions which overlie the outer diameter of the circular region and which engage the end faces of the annular seat ring to exert axial forces on the seat ring in a direction perpendicular to the pipe flanges. Each of the spacer rings includes an integral lip which extends in an axial direction from the inner diameter of the spacer ring, with the lip of each spacer ring engaging a limited marginal portion of the seat ring at its inner diameter adjacent an end face of the seat ring. The spacer ring or end ring lips accordingly operate to center the spacer rings relative to the seat ring and relative to the opposed body sections, and also assist in supporting the annular seat ring in place relative to the opposed body halves thereby minimizing or eliminating the possibility of seat wash-out under service conditions.

The seat ring may comprise a single annulus of elastomeric material or, if desired, it may comprise a composite annulus comprising a first annulus of comparatively resilient material which engages the semi-circular inner surfaces of the opposed body halves and a second annulus of a protective plastic material, e.g., Teflon, disposed between the first annulus and the periphery of the valve disc.

BRIEF DESCRIPTION OF THE DRAWINGS

The foregoing objects, advantages, construction and operation of the present invention will become more readily apparent from the following description and accompanying drawings in which

FIG. 3 depicts a portion of the valve of the present invention in its closed condition;

FIG. 4 illustrates a portion of the valve unit of the present invention employing a modified seat arrangement; and FIG. 5 is an exploded representation of the valve unit of the present invention.

DESCRIPTION OF THE PREFERRED EMBODIMENTS

Referring to the several figures, like numerals of which refer to like parts throughout, the invention comprises a wafer-type butterfly valve, generally designated 10 which is adapted to be disposed between a pair of pipe flanges 11, 12 in a pipeline, the flanges having a plurality of axially oriented bolts 13 extending therebetween for exerting axially directed forces on valve unit 10 to retain the unit in place between said pipe flanges. Valve unit 10 exhibits an overall axial dimension which corresponds to the distance between pipe flanges 11 and 12, and the valve unit is interchangeable with conventional style wafer-type butterfly valves in that the conventional valve can be removed from between flanges 11 and 12 and the modified valve of the present invention slipped into place.

Figure 2:
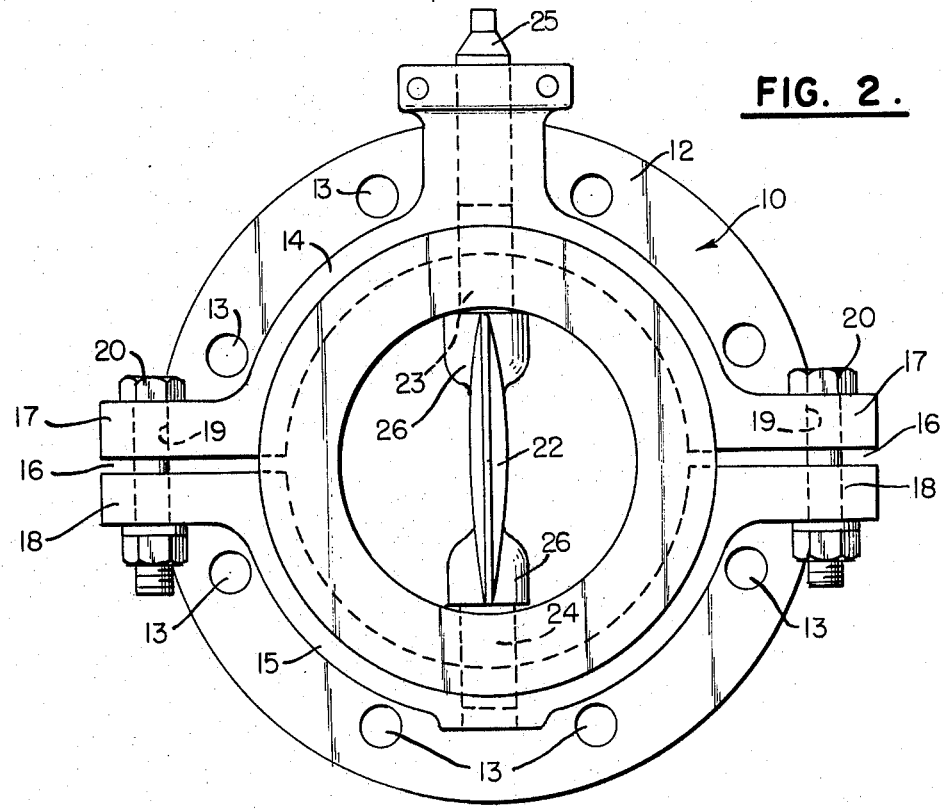
FIG. 2 is an end view of the valve of the present invention, taken on line 2—2 of FIG. 1.

Valve unit 10 comprises a pair of separate, metallic body halves 14, 15 of substantially semi-circular cross-sectional shape (see especially FIGS. 2 and 5) which are positioned in spaced, opposed relation to one another to define a substantially semi-circular region therebetween. The spacing between body halves has been designated 16 in FIG. 2. Each body half further includes a pair of outstanding flanges 17, 18 respectively having bolts 19 therein which receive nut and bolt assemblies 20 acting as adjustable fastening means operative to selectively vary the radial spacing between body halves 14, 15 for the purposes to be described hereinafter.

The two body halves 14, 15 are each of flat-sided configuration and the opposing flat sides of each body half are intended for positioning in planes substantially parallel to the inner surfaces of pipe flanges 11, 12. Each body half includes planar end faces which are positioned in alignment with the spaced planar end faces of the other body half (e.g., see FIGS. 1 and 3) and the face-to-face dimension $x$ of each body half is less than the laying length $y$ between the pipe flanges. This difference between the face-to-face body dimensions of the valve, and the laying length of the pipe flanges, is accommodated through the use of spacer or end rings which cooperate with the opposed body halves, as will also be described.

Figure 1:
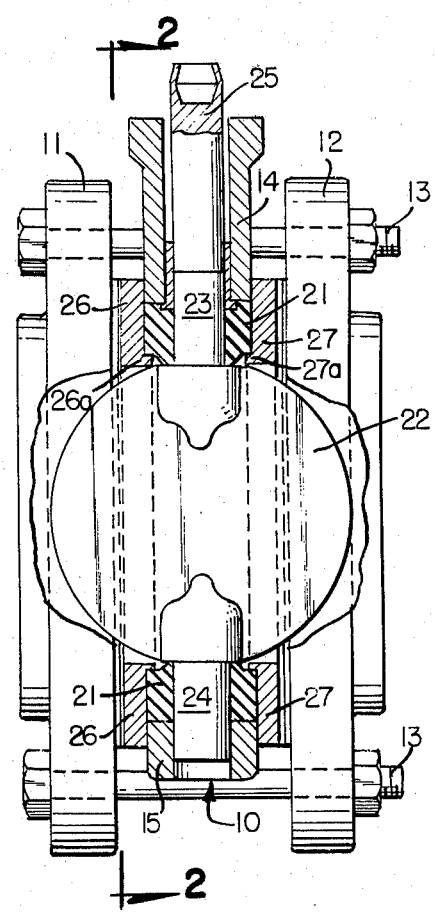
FIG. 1 is a cross-sectional view, partially broken away, of a wafer-type butterfly valve constructed in accordance with the present invention.
Figure 1A:
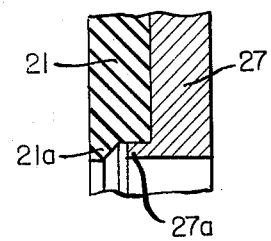
FIG. 1A is a detail illustrating the cooperation between the seat ring and an adjacent end ring.

A resilient seat ring 21 of annular configuration is positioned in the substantially circular region between the body halves with the outer diameter of the seat ring being in direct, sealing engagement with the spaced substantially semi-circular inner surfaces of the opposed body halves 14, 15 (see especially FIG. 3). Seat ring 21 may have an inner circular periphery of uniform dimension as shown in FIGS. 3 and 5, or the inner periphery of the seat ring can include a marginal portion of first diameter which merges into a central portion 21a that protrudes inwardly toward the axis of the valve as shown in FIGS. 1 and 1A. The seat ring may, moreover, comprise a homogeneous resilient material e.g., an elastomer, as shown in FIGS. 1, 1A, and 3, or it may comprise a composite structure (see FIG. 4) consisting of an elastomeric annulus 21b the inner circular periphery of which supports a further annulus 21c of protective plastic material such as Teflon. In either event, whether the seat be of elastomer alone or of composite construction, it is important that the seat be sufficiently firm or hard so that when the valve is installed in the line there will be adequate stress imposed on the seat, through compression of the valve into the line, to form a suitable seal.

A valve disc 22 is mounted for pivotal movement within seat ring 21. The outer periphery of disc 22 is in sealing engagement with the inner periphery of the seat ring (e.g., FIG. 3) and disc 22 is provided with a pair of diametrically opposed shaft sections 23, 24 which extend through corresponding apertures 23a, 24a in the seat ring (see FIG. 5) and thence into journals in the opposed body halves to permit the disc to be selectively turned through 90° by means of a manual or automatic operator (generally designated 25 in FIGS. 1 and 2) to open or close the valve. The shaft sections 23, 24 are joined to disc 22 through the agency of enlarged shoulder portions 26 which bear upon the inner periphery of the seat ring 21 to provide a shaft seal.

The valve unit is completed by a pair of separate, metallic spacer rings or end rings 26, 27 (only one of which is shown in FIG. 5) each having a flat-sided, annular configuration. The two rings 26, 27 are preferably but not necessarily identical and are disposed in axially spaced relation to one another on opposite sides of the opposed valve bodies 14, 15 with each ring extending continuously around the circular region defined between the opposed body halves. Each end ring has an outer diameter which is larger than the maximum adjusted diameter of the circular region between the body halves whereby a flat interior surface of each end ring 26, 27 is always in metal-to-metal engagement with the adjacent flat end faces of the opposed body halves regardless of how the radial spacing between the opposed body halves may be varied. In addition, the inner diameter of each end ring 26, 27 is sufficiently small to assure that the flat interior side of each end ring includes a portion which overlies and sealingly engages the adjacent end face of seat ring 21. As a result, when throughbolts 13, extending between flanges 11, 12, are tightened, axial forces are not only imposed through end rings 26, 27 onto the opposed body halves 14, 15 to retain the valve unit in position, but axial forces are also imposed between the end rings 26, 27 and the seat ring 21 to help retain the seat ring in place and to achieve a good seal between the seat ring and end rings.

Each end ring 26, 27 further includes an integral annular lip 26a, 27a respectively which extends in an axial direction from the inner diameter of the end ring in question into engagement with a limited marginal portion of the inner circular periphery of the seat ring. Lips 26a, 27a thus perform a locating function in that they operate to center the two end rings 26, 27 relative to seat ring 21 and relative to opposed body halves 14, 15; and the lips 26a, 27a also act to inhibit any flexing or tortional action of the seat ring 21 thereby preventing or minimizing the possibility of the seat from being "washed out" i.e., being displaced relative to the body halves by rapidly flowing fluids. The thicknesses of the two end rings or spacer rings 26, 27 are so chosen in relation to the axial dimension of the body halves 14, 15 that, when these spearate parts are assembled in the manner described, the overall valve unit then has an axial dimension which corresponds to the spacing y between pipe flanges 11, 12. By providing interchangeable, nonintegral end rings such as 26, 27, the valve can be readily matched to various flange faces or body thicknesses as may be desired.

In practice, the various elements described are assembled in the manner illustrated in the drawings and are then slipped between pipe flanges 11, 12. The user may, if desired and as is conventional, provide suitable gaskets between the outer surfaces of the end rings 26, 27 and the inner surfaces of pipe flanges 11, 12, and bolts 13 are then tightened into place to compress the valve unit into the line in sealed relation to the pipe flanges. When the unit is so compressed into the line, the outer periphery of seat ring 21 is in sealing engagement with the inner substantially semi-circular surfaces of body halves 14, 15, the end faces of seat ring 21 being in sealing engagement with the inner flat faces of end rings 26, 27, and the inner periphery of the seat ring being in sealing engagement with the outer periphery of valve disc 22 and with its shaft shoulders 26.

If an adequate seal is not provided at the time of initial assembly, or if the valve should start to leak after a period of service, bolts 13 can be loosened somewhat, whereafter bolts 20 can then be loosened or tightened as may be necessary to achieve the desired amount of sealing forces, and bolts 13 can then be retightened. During the adjustment of bolts 20, and the resultant movement of body halves 14, 15 toward or away from one another, the inner flat surfaces of end rings 26, 27 will slide in a radial direction relative to the facing flat surfaces of the body halves to maintain the desired metal-to-metal contact between the end rings and body halves, and to keep the inner flat surfaces of the end rings in engagement with the outer end surfaces of the seat ring 21.

To assure that appropriate sealing forces are always provided between the end faces of the seat ring 21 and the adjacent inner flat surfaces of end rings 26, 27, it is preferable that the unstressed axial dimension of the seat ring 21 be somewhat greater than the face-to-face dimension of body halves 14, 15 prior to assembly of the various elements so that, when the elements are assembled, end rings 26, 27 squeeze the seat ring 21 into a shorter condition and thereby generate the necessary sealing forces between the end rings and seat ring. Subsequent adjustment of the radial spacing between the opposed body halves, and the resultant variation in radial forces which are imposed upon the seat ring, will tend to bulge the seat ring to a greater or lesser extent relative to the periphery of disc 21 and relative to its shaft shoulders 26 due to the fact that the axial dimension of the seat ring is held fixed by the opposing end rings 26, 27. Although the adjustment is made by closing in two semi-circular body halves against a completely circular seat ring, which obviously results in a nonuniform constriction therebetween, the characteristics of the elastomer employed have been found to be sufficiently resilient to provide an adequate and adjustable seal regardless of whether the seat is a homogeneous elastomer, or a composite annular construction such as a Teflon-lined rubber seat.

Because the valve is assembled essentially metal-to-metal (except for the intervening, thin, nonresilient sealing gaskets which may be associated with the inner surfaces of pipe flanges 11, 12) alignment problems that sometimes exist with other styles of wafer-type butterfly valves are eliminated. Valves constructed in accordance with the present invention can be used on a replacement and maintenance basis where other types of wafer valves are currently being used, and are readily interchangeable with valves in prior service. The valve exhibits numerous benefits such as the provision of positive shut-off operation and long service life, particularly since any tendency for leakage can be readily compensated by the adjustment capability of the valve thus overcoming many of the maintenance problems which currently plague users of standard style wafer-type butterfly valves.

While we have thus described preferred embodiments of the present invention, many variations are possible. For example, the end faces of the opposed body halves, rather than being entirely planar as illustrated, may be formed respectively with semi-circular recesses which cooperate to provide substantially circular recesses, at opposite ends of the assembled body, which receive the end rings. The diameter of such end-face recesses must, however, be sufficiently large to permit radial adjustment of the body halves as described, i.e., the diameter of each such end-face recess must be no less than the diameter of an end ring when the body halves are adjusted to their minimum radial spacing. Moreover, instead of using the described lips, or in addition thereto, other structural arrangements can be employed to assist in centering the end rings relative to the valve seat and to inhibit seat wash out. Still further variations will be apparent to those skilled in the art, and it must therefore be understood that the foregoing description is intended to be merely illustrative of rather than limitative of the present invention.

Having thus described our invention, we claim:

1. A wafer-type butterfly valve unit adapted for insertion between a pair of spaced pipe flanges in a pipeline wherein said flanges have a plurality of bolts extending therebetween in an axial direction transverse to said flanges for exerting axially directed forces upon said unit to retain said unit between said pipe flanges, said butterfly valve unit comprising a pair of separate metallic body halves of substantially semi-circular cross-sectional shape positioned in spaced, opposed relation to one another to define a substantially circular region therebetween, each of said body halves having a pair of spaced parallel planar end faces which are positioned in alignment with the spaced planar end faces of the other body half, each of said end faces being adapted to be positioned in spaced, substantially parallel relation to the pipe flanges, the face-to-face dimension between the spaced end faces of each body half being less than the spacing between the pipe flanges, adjustable fastening means extending between said body halves for exerting radially directed forces between said body halves to selectively vary the radial spacing between said body halves, a resilient seat ring of unitary annular configuration positioned in the substantially circular region between said body halves, a valve disc mounted for pivotal movement within said seat ring, the outer periphery of said valve disc being in engagement with the inner diameter of said seat ring and the outer diameter of said seat ring being in engagement with the spaced substantially semicircular inner surfaces of said opposed body halves whereby adjustment of said fastening means is operative to vary the dimensions of said substantially circular region to vary the forces exerted on said seat ring in a direction parallel to the pipe flanges thereby to vary the sealing forces between said seat ring and said valve disc, and a pair of separate, metallic spacer rings of flat, annular configuration disposed in spaced relation to one another in engagement with the aligned end faces of said opposed body halves respectively to fill the space between said end faces of said opposed body halves and the pipe flanges respectively, the outer diameter of each of said spacer rings being sufficiently large to maintain each spacer ring in metal-to-metal surface engagement with the adjacent aligned end faces of said body halves and in radially slidable engagement with said adjacent aligned end faces when the radial spacing between said body halves is varied by adjustment of said fastening means, the inner diameter of each of said flat spacer rings being less than the maximum adjusted diameter of the substantially circular region between said opposed body halves whereby said spacer rings define flat surface portions which overlie the outer diameter of said circular region and which engage and confine the end faces of said annular seat ring to exert axial forces on said seat ring in a direction perpendicular to said pipe flanges.

2. The valve unit of claim 1 wherein each of said spacer rings includes an integral lip extending in an axial direction from the inner diameter of said spacer ring, said lips of said pair of spacer rings being spaced from one another and extending toward one another in engagement with portions of the inner diameter of said seat ring adjacent the end faces of said seat ring whereby said lips center said spacer rings relative to said seat ring and assist in supporting said annular seat ring in place relative to said opposed body halves.

3. The valve unit of claim 1 wherein the axial dimension of said seat ring, prior to its confinement between said spacer rings, is greater than the face-to-face dimension of each body half.

4. The valve unit of claim 3 wherein the inner surface of said seat ring has a uniform diameter between the end faces of said seat ring.

5. The valve unit of claim 3 wherein the inner surface of said seat ring has a first diameter adjacent the end faces of said seat ring, and a second, lesser diameter intermediate the end faces of said seat ring.

6. The valve unit of claim 1 wherein said seat ring comprises a first annulus of elastomeric material in engagement with said semi-circular inner surfaces of the opposed body halves, and a second annulus of plastic material disposed between said first annulus and said valve disc, at least said second annulus having opposed end faces which sealingly engage said pair of spacer rings respectively.

7. The valve unit of claim 6 wherein both said first and second annuli have end faces in sealing engagement with said pair of spacer rings.

8. A wafer-type butterfly valve unit for insertion between a pair of spaced pipe flanges in a pipeline, said unit comprising a pair of flat-sided metallic body halves of substantially semi-circular interior cross section positioned in spaced, opposed relation to one another to define a substantially circular region therebetween, a flat-sided annular seat ring of resilient material located within said region, the flat sides of said seat ring being substantially parallel to the flat sides of said body halves and the outer circular periphery of said seat ring being in engagement with the inner semi-circular surfaces of said body halves, a valve disc mounted for pivotal movement within said seat ring, the outer periphery of said valve disc being in sealing engagement with the inner circular periphery of said seat ring, adjustment means extending between said body halves for selectively varying the spacing between said body halves to vary the forces exerted by said body halves on said seat ring thereby to vary the sealing force between said seat ring and said valve disc, and a pair of flat-sided metallic end rings extending continuously around said circular region adjacent the opposite sides of said body halves respectively, said end rings being separate from said body halves, each of said end rings including an inwardly projecting lip which engages a limited marginal portion of the inner circular periphery of said seat ring to center said end ring relative to said opposed body halves, each of said end rings also including a first flat interior surface portion in sealing engagement with the flat-sided surface at one end of said seat ring to confine said seat ring in an axial direction, and each of said end rings further including a second flat interior surface portion in metal-to-metal contact with the flat body sides of said pair of body halves at positions radially outward of said seat ring for sliding engagement with said flat body sides as the spacing between said body halves is varied by said adjustment means.

9. The valve unit of claim 8 wherein the sum of the thicknesses of said pair of end rings and of each body half, in a direction along the axis of said seat ring, is substantially equal to the spacing between said pair of pipe flanges.

10. The valve unit of claim 9 wherein said pair of end rings are identical to one another in dimension and configuration.

11. The valve unit of claim 8 wherein said seat ring comprises a unitary annulus of elastomeric material.

12. The valve unit of claim 8 wherein said seat ring comprises a composite structure including an annulus of resilient material the inner circular periphery of which supports a further annulus of plastic material.

13. The valve unit of claim 8 wherein the axial dimension of said seat ring, prior to confinement of said seat ring between said end rings, is greater than the axial dimension between the opposing flat sides of each of said body halves whereby, when said end rings are positioned in metal-to-metal contact with the flat sides of said body halves, the end rings compress and shorten said seat ring in an axial direction.

* * * * *